United States Patent [19]

Johnston

[11] Patent Number: 4,947,770

[45] Date of Patent: Aug. 14, 1990

[54] COULTER AND FERTILIZER APPLICATOR LINKAGE ARRANGEMENT

[75] Inventor: Mark Johnston, Macomb, Ill.

[73] Assignee: Yetter Manufacturing Company, Colchester, Ill.

[21] Appl. No.: 377,232

[22] Filed: Jul. 7, 1989

[51] Int. Cl.⁵ ........................ A01C 23/02; A01B 35/28
[52] U.S. Cl. .................................. 111/121; 111/123; 111/167; 111/927; 172/166; 172/710
[58] Field of Search ............... 111/120, 121, 123, 140, 111/157, 163–169, 927; 172/166, 572, 573, 710

[56] References Cited

U.S. PATENT DOCUMENTS

| | | | |
|---|---|---|---|
| 2,713,299 | 7/1955 | Shager et al. | 111/123 |
| 3,319,589 | 5/1967 | Moran | 111/121 |
| 3,331,341 | 7/1967 | Hartwig | 111/164 |
| 4,628,840 | 12/1986 | Jacobson | 111/121 |
| 4,656,957 | 4/1987 | Williamson et al. | 111/121 |

Primary Examiner—Danton D. DeMille
Attorney, Agent, or Firm—Lee, Mann, Smith, McWilliams & Sweeney

[57] ABSTRACT

A parallel linkage arrangement for supporting a coulter disc and liquid fertilizer applicator on an agricultural tool bar such that the coulter disc and the fertilizer applicator maintain the same relative relationship to the ground regardless of vertical travel of the coulter disc or the applicator.

4 Claims, 2 Drawing Sheets

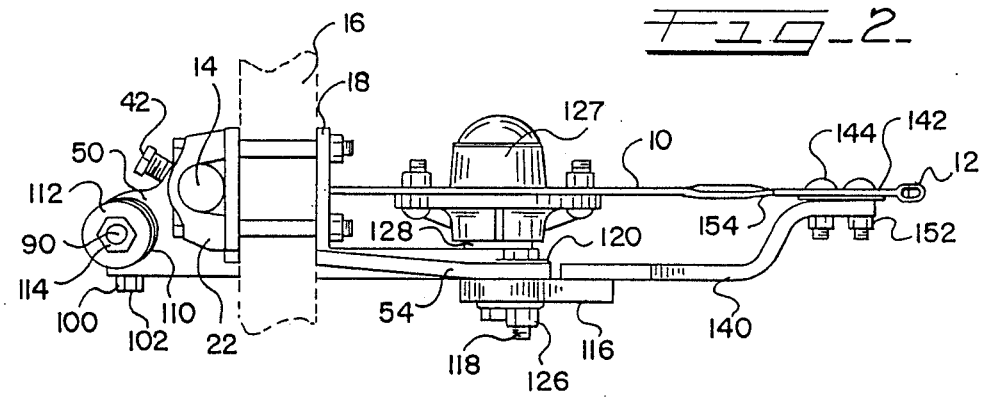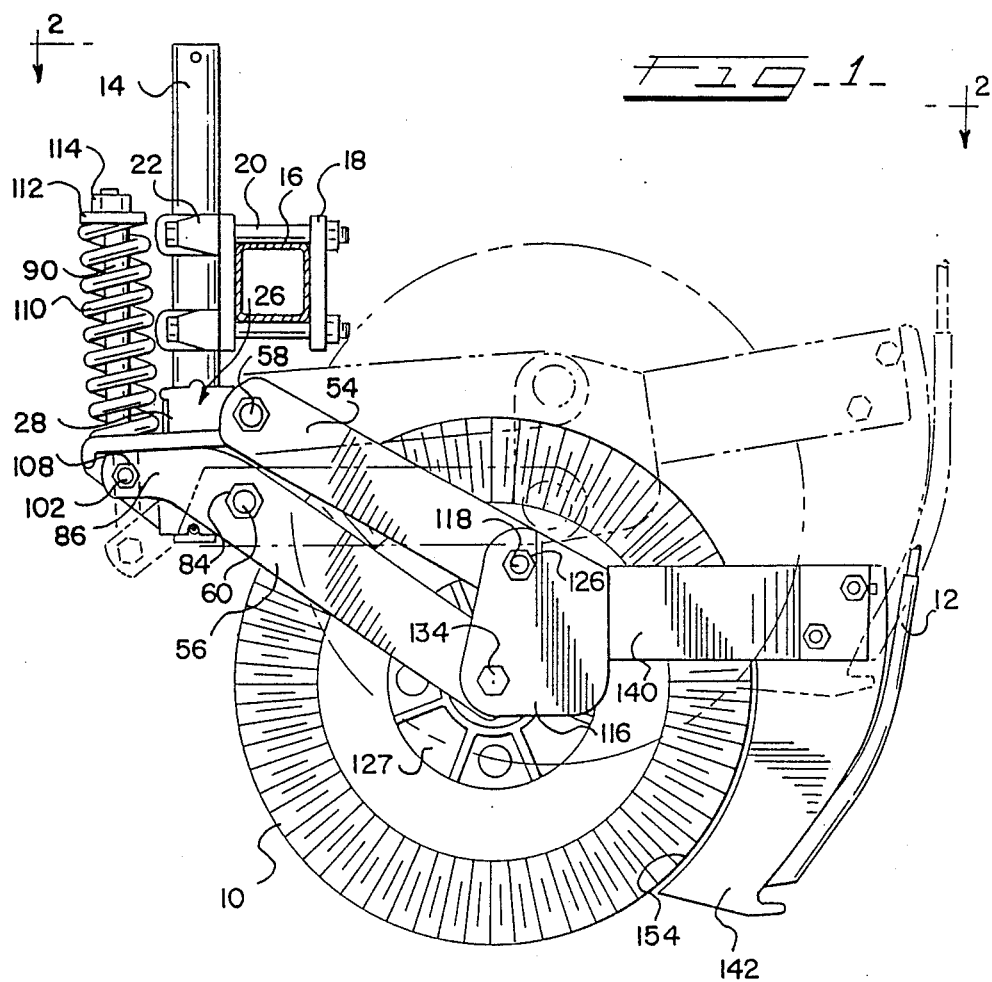

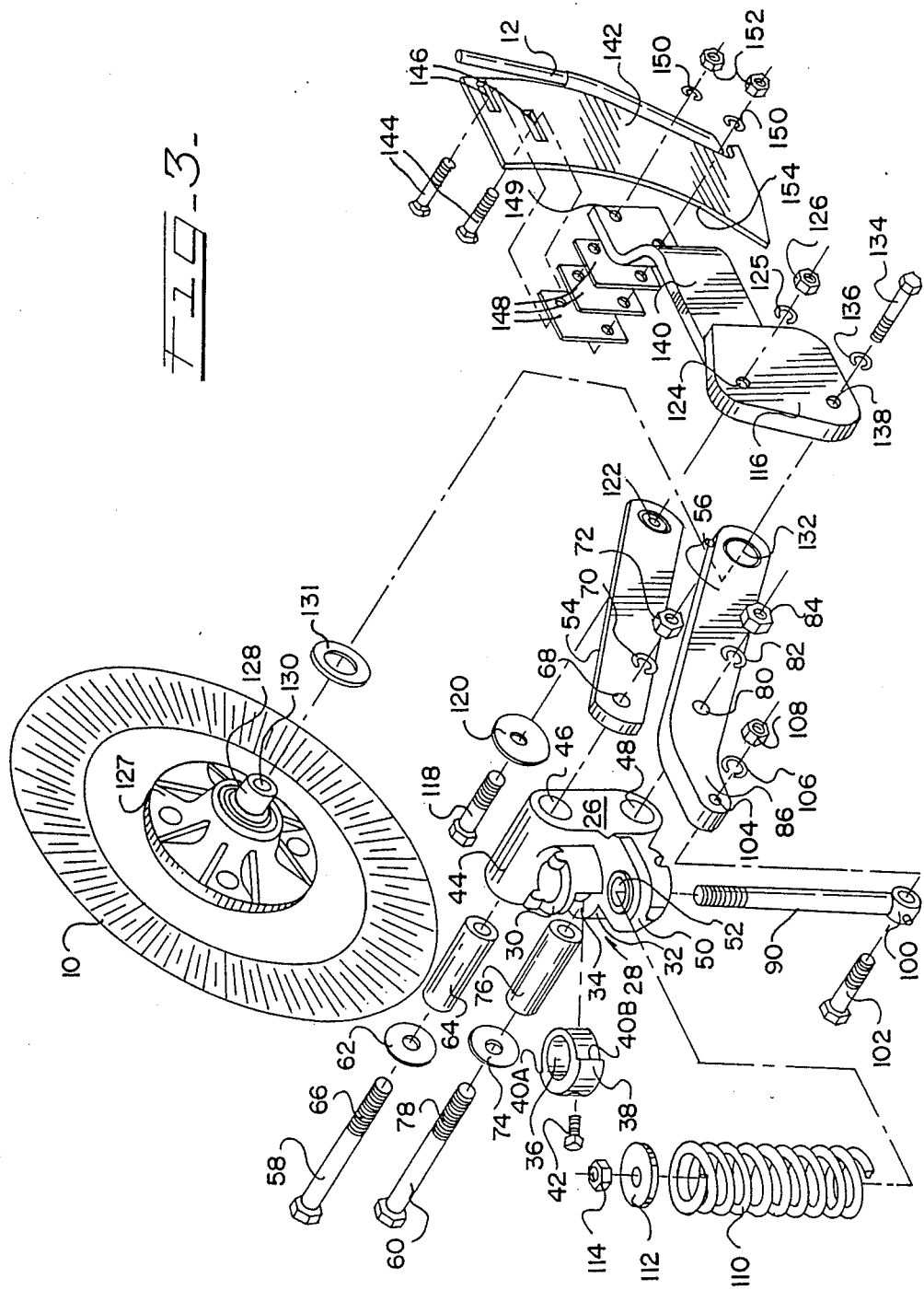

COULTER AND FERTILIZER APPLICATOR LINKAGE ARRANGEMENT

BACKGROUND OF THE INVENTION

The present invention is directed to a coulter and knife linkage arrangement in which the knife supports a liquid fertilizer applicator. Numerous arrangements of this general type are shown in the prior art U.S. Pat. Nos. 3,319,589, 3,707,132, 4,214,537, 4,311,104, 4,539,921, 4,594,951, 4,656,957, 4,745,978 and 4,759,411. None of these arrangements discloses the features of the present invention.

SUMMARY OF THE INVENTION

The present invention is directed to an arrangement for mounting a coulter disc and a liquid fertilizer applicator. The arrangement includes a vertical shank, one end of which is attached to an agricultural tool bar and the other end of which supports a mounting block. A pair of pivot arms are pivotally connected to the mounting block in parallel relation. A connector plate is pivotally mounted to the free ends of the pivot arms and a coulter disc also is mounted to the free end of one of the pivot arms. A pressure rod is connected between the pivot arm to which the disc is mounted and the mounting block. Biasing means is associated with the pressure rod to resist upward movement of the coulter disc. Rigidly attached to and extending outwardly from the connector plate is a support arm. A liquid fertilizer application conduit is mounted on the support arm. The mounting block, pivot arms and connector plate form a parallel linkage arrangement to which the support arm, coulter disc and liquid fertilizer application conduit are connected. This arrangement permits the coulter disc and the conduit to maintain the same relative relationship with the ground regardless of vertical travel.

BRIEF DESCRIPTION OF THE DRAWINGS

FIG. 1 is a side view of the mounting arrangement showing, in phantom, the disc in its raised position.

FIG. 2 is a top view of the mounting arrangement shown in FIG. 1, taken along the lines 2—2 of FIG. 1.

FIG. 3 is an exploded perspective view of the mounting arrangement.

DETAILED DESCRIPTION OF THE INVENTION

A coulter and fertilizer applicator linkage arrangement which permits a coulter disc 10 and a liquid applicator 12 to maintain the same relative relationship, is shown in FIGS. 1–3 of the drawings. As best shown in FIG. 1, the arrangement includes a vertically disposed shank 14 secured to an agricultural tool bar 16 which is pulled by a tractor or similar motive means. Plates 18 disposed on opposing faces of the tool bar 16 are secured by means of bolts 20 which are inserted through apertures in clamps 22 and through apertures defined in the plates 18 to attach the shank 14 to the tool bar 16.

A mounting block, generally designated by the numeral 26, is supported at the lower end of the shank 14. The mounting block 26 defines a mounting collar 28 having an upper portion 30 and a lower portion 32, which are concentric and vertically spaced to define an opening 34 between them. The mounting collar 28 is sized to receive and to freely rotate about the shank 14. A locking collar 36 is sized for insertion in the opening 34 and also to receive the shank 14. The locking collar 36 defines an arcuate segment 38 having stops 40A and 40B formed on each end face. A set screw 42 secures the locking collar 36 to the shank 14 by engaging it to prevent relative rotation therebetween. The locking collar 36 coacts with the mounting collar 28 such that when the mounting collar 28 pivots about the shank 14, the mounting collar 28 contacts stop 40A or 40B on the locking collar 36, thereby limiting the rotation of the mounting collar 28 about the shank 14 within predetermined limits as more fully disclosed in U.S. Pat. No. 4,759,411 issued to Yetter Manufacturing Company, assignee of the present application.

The mounting block 26 is also provided with an integral support element 44 defining a pair of generally cylindrical, horizontally-disposed bores 46 and 48 therethrough, bore 46 disposed above and in parallel relation to bore 48. A flange 50 extends outwardly from the lower portion of the mounting collar 28 and the support element 44 and defines therethrough an aperture 52.

A first pivot arm 54 and a second pivot arm 56 are pivotally connected to the support element 44 of the mounting block 26 by means of bolts 58 and 60, respectively. Bolt 58 is inserted through a washer 62 and through a sleeve 64 which is rotatably disposed within the bore 46. A threaded portion 66 of the bolt 58 is received through an aperture 68 defined through one end of the pivot arm 54 and a lock washer 70 and nut 72 are threadably secured thereto. Likewise, bolt 60 is inserted through a washer 74 and through a sleeve 76 which is rotatably disposed within the bore 48. A threaded portion 78 of the bolt 60 is received through an aperture 80 defined in the second pivot arm 56 and a lock washer 82 and nut 84 are threadably secured thereto. The second pivot arm 56 includes an extension 86 which extends outwardly from the aperture 80 which forms the pivotal connection of the arm 56 to the support element 44.

A pressure rod 90 is inserted through the flange aperture 52 of the mounting block 26. The upper end of the rod 90 is threaded and the lower end is provided with a boss 100. A bolt 102 is inserted through the boss 100 and threaded into an aperture 104 defined through the extension 86. A lock washer 106 and nut 108 are threaded upon the bolt 102 to pivotally secure the extension 86 to the boss 100, thereby securing the second pivot arm 56 via the extension 86 to the rod 90. A compression spring 110 is disposed about the rod 90. A washer 112 is placed atop the spring 110 so that the rod 90 is received therethrough and a lock nut 114 is threaded to the threaded portion of the rod 90. This assembly provides resiliency to the coulter and applicator arrangement, as for example, when a rock or other obstacle is encountered, but resists pivoting of the pivot arm 56 and coulter disc 10.

A connector plate 116 is pivotally attached to the free ends of the first and second pivot arms 54 and 56. A bolt 118 is inserted through a washer 120, through an aperture 122 defined in the end of the first pivot arm 54 and through a corresponding aperture 124 defined through the upper end of the connector plate 116. A lock washer 125 and a nut 126 are threaded to the bolt 118, thereby attaching the connector plate 116 to the first pivot arm 54. The coulter disc 10 is mounted upon a hub 127 having an axle 128 defining a threaded bore 130. A washer 131 is disposed about the axle 128. The axle 128 is rotatably inserted through an aperture 132 formed in the end of the second pivot arm 56. A bolt 134 is inserted through a lock washer 136 and through an aperture 138 defined through the lower end of the connector plate 116 and is threadably secured within the axle bore 130, thereby attaching the coulter disc 10 and connector plate 116 to the second pivot arm 56.

A generally S-shaped knife support arm 140 is rigidly attached to and extends from the connector plate 116. A knife 142 is adjustably fastened to the support arm 140 by means of bolts 144 which are inserted through horizontal adjustment slots 146 defined through the upper end of the knife 142 through a plurality of adjustment shims 148 and through apertures 149 defined through the free end of the support arm 140. The horizontal adjustment slots 146 permit the spacing between the disc 10 and the knife 142 to be varied uniformly, as more fully disclosed in U.S. Pat. No. 4,656,957 issued to Yetter Manufacturing Co., assignee of the present application. Lock washers 150 and nuts 152 are threadably secured to the bolts 144 to secure the knife assembly. The knife 142 defines a leading edge 154 which is substantially complimentary in configuration to the outer periphery of the coulter disc 10. The S-shape of the support arm 140 permits planar alignment of the disc 10 and the knife 142, as best seen in FIG. 2. The liquid fertilizer applicator 12 comprises a conduit which is connected to the knife 142 for dispensing liquid fertilizer into a trench created by the coulter disc 10. While the above-described embodiment of the present invention is directed to an arrangement for mounting a liquid fertilizer applicator, it is understood that means for dispensing non-liquid fertilizer may be substituted therefor.

As best seen in FIG. 1, the mounting block 26, first pivot arm 54, second pivot arm 56 and connector plate 116 form a parallel linkage arrangement. As shown in phantom in FIG. 1, when the coulter disc 10 is forced upwardly, as for example, when harder or less penetrable ground is encountered, the second pivot arm 56 pivots about bolt 60. The knife arm 140, knife 142 and conduit 12, pivot about bolt 134 so that the coulter disc 10, knife 142 and conduit 12 maintain the same relative relationship with the ground regardless of vertical travel of the coulter disc 10 or the fertilizer applicator 12. This arrangement permits more accurate placement of the fertilizer and thus is more efficient and economical.

Thus it has been shown that the present invention provides a parallel linkage arrangement for mounting a coulter disc and a liquid applicator, whereby the relative positions of the coulter disc and liquid applicator are maintained regardless of any vertical movements of either the applicator or the disc.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A coulter disc and fertilizer applicator mounting arrangement including a vertical support bar adapted to be rigidly attached directly to an agricultural tool bar and mounted perpendicular thereto, a mounting block formed as an integral element rotatably supported on said vertical support bar, said mounting block including an integral mounting collar extending outwardly therefrom adapted to receive and to rotate about said vertical support bar, an integral support element having a pair of bores disposed horizontally therethrough spaced in vertical relation to each other and an integral flange member extending outwardly from said mounting block defining an aperture therethrough; a first pivot arm having a leading end and a distal end and means pivotally connecting said first pivot arm through one of said bores to said mounting block at said leading end of said first pivot arm, a second pivot arm having a leading end and a distal end and means pivotally connecting said second pivot arm through the other of said bores to said mounting block at a pivot point between said ends of said second pivot arm and positioned so as to lie generally parallel to said first pivot arm, a connector plate pivotally connected to said distal end of said first pivot arm and said connector plate pivotally connected to said distal end of said second pivot arm, a coulter disc connected to said second pivot arm and said connector plate, a support arm rigidly attached to and extending from said connector plate, a fertilizer applicator mounted on said support arm and connectable to a source of fertilizer for dispensing fertilizer into a trench created by said coulter disc, a pressure rod extending through said aperture in said integral flange member and pivotally connected to said leading end of said second pivot arm remote from said connector plate, said pivot point of said second pivot arm disposed between said pressure rod and said connector plate and biasing means connected between said integral flange member of said mounting block and said pressure rod adapted to resist upward movement of said coulter disc such that said mounting block, said first and second pivot arms and said connector plate are connected so as to form a parallel linkage arrangement to which said coulter disc and fertilizer applicator are connected such that as said coulter disc, through said second pivot arm, pivots about said pivot point, said support arm and fertilizer applicator also pivot so that said coulter disc and said fertilizer applicator maintain the same relative relationship with the ground regardless of vertical travel.

2. The mounting arrangement of claim 1 including a locking collar associated with said mounting collar and adapted to cooperate therewith to confine rotation of said mounting block about said support bar within predetermined limits.

3. The mounting arrangement of claim 1 including a knife mounted on said support arm, said knife having a leading edge substantially complimentary in configuration to the outer periphery of said coulter disc, disposed rearwardly of said disc and in partial surrounding relationship thereto, said fertilizer applicator supported by said knife.

4. The mounting arrangement of claim 3 wherein said knife is provided with horizontal adjustment slots to uniformly vary the spacing between said knife and said coulter disc.

* * * * *